United States Patent
Burns

(10) Patent No.: US 9,282,127 B1
(45) Date of Patent: Mar. 8, 2016

(54) MOBILE DATING APPLICATION UTILIZING SOCIAL MEDIA, FACIAL RECOGNITION AND GPS-BASED USER PAIRING

(71) Applicant: Anthony Nicholas Burns, Copperas Cove, TX (US)

(72) Inventor: Anthony Nicholas Burns, Copperas Cove, TX (US)

( * ) Notice: Subject to any disclaimer, the term of this patent is extended or adjusted under 35 U.S.C. 154(b) by 0 days.

(21) Appl. No.: 14/448,142

(22) Filed: Jul. 31, 2014

(51) Int. Cl.
- *H04L 29/06* (2006.01)
- *H04N 7/14* (2006.01)
- *G06T 7/00* (2006.01)
- *H04M 1/725* (2006.01)

(52) U.S. Cl.
CPC ............ *H04L 65/1089* (2013.01); *G06T 7/004* (2013.01); *H04N 7/147* (2013.01); *H04M 1/72577* (2013.01)

(58) Field of Classification Search
None
See application file for complete search history.

(56) References Cited

U.S. PATENT DOCUMENTS

| | | | |
|---|---|---|---|
| 8,922,480 B1 * | 12/2014 | Freed et al. | 345/156 |
| 2010/0205667 A1 * | 8/2010 | Anderson et al. | 726/19 |
| 2011/0286585 A1 * | 11/2011 | Hodge | 379/88.02 |
| 2013/0283401 A1 * | 10/2013 | Pabla et al. | 726/30 |
| 2015/0370323 A1 * | 12/2015 | Cieplinski | G06F 3/1423 345/156 |

* cited by examiner

*Primary Examiner* — Fan Tsang
*Assistant Examiner* — Jeffrey Lytle
(74) *Attorney, Agent, or Firm* — Plager Schack LLP

(57) ABSTRACT

A method and electronic device configured for automatically terminating, or providing an option to a participant of a video-chat session, upon determining that more than a user's face is being exposed to a camera of the electronic device during the video-chat session.

18 Claims, 4 Drawing Sheets

MOBILE DATING APPLICATION UTILIZING SOCIAL MEDIA, FACIAL RECOGNITION AND GPS-BASED USER PAIRING

BACKGROUND

The present disclosure relates generally to social networking, and more particularly, to a method and mobile electronic device configured to prevent obscene gestures from being captured thereby during a videoconference/video-chat session.

The proliferation of social media applications on mobile electronic devices has made it easier than ever for individuals to engage in videoconferencing/video-chat sessions (hereinafter "video-chat") from anywhere and at any time. Unfortunately, there exists a potential for a participant to engage in potentially lewd and lascivious behavior during the video-chat that the other participant finds offensive. Typical dating applications/social media applications do not pair users to the gender or sexual orientation of their choice, and participants to video-chat sessions sometimes choose to conduct themselves in an inappropriate manner.

It would therefore be desirable to provide a mechanism by which a video-chat session can be automatically terminated if a participant attempts to engage in lewd behavior.

SUMMARY OF THE DISCLOSURE

In accordance with an aspect of the disclosure, there is provided a method for terminating a video-chat session on a mobile electronic device comprising at least one processor, a non-transitory memory medium, and a camera. The method comprises the steps of: executing an application on the processor, the application comprising machine readable instructions stored on the non-transitory memory medium, to determine when more than a user's face is captured by the camera of the electronic device during the video-chat session, the determination being a function of at least one of stored facial features for the user and a distance between the user's face and the electronic device; and generating a video-chat interrupt signal based on the determination.

In accordance with another aspect of the disclosure, an electronic device is configured for participating in a video-chat session over a communications network, and for terminating the video-chat session upon the occurrence of a user exposing more than the user's face during the video-chat session. The electronic device comprises: at least one processor and at least one non-transitory memory medium comprising machine-readable instructions which, when executed by the at least one processor, enable the electronic device to: initiate a video-chat session with another electronic device over the communications network; determine when more than the user's face is captured by the camera of the electronic device during the video-chat session, the determination being a function of at least one of stored facial features for the user and a distance between the user's face and the electronic device; and generate a video-chat interrupt signal based on the determination.

In accordance with these aspects and additional aspects of the disclosure that will become apparent hereinafter, the present disclosure will now be described with particular reference to the accompanying drawings.

BRIEF DESCRIPTION OF THE DRAWINGS

The accompanying drawings, which are incorporated herein and constitute part of this specification, illustrate embodiments of the disclosure and together with the description, serve to explain the principles thereof. The embodiments illustrated herein are presently preferred, it being understood, however, that the disclosure is not limited to the precise arrangements and instrumentalities shown, wherein.

DETAILED DESCRIPTION OF THE PREFERRED EMBODIMENT(S)

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

Figure 1:
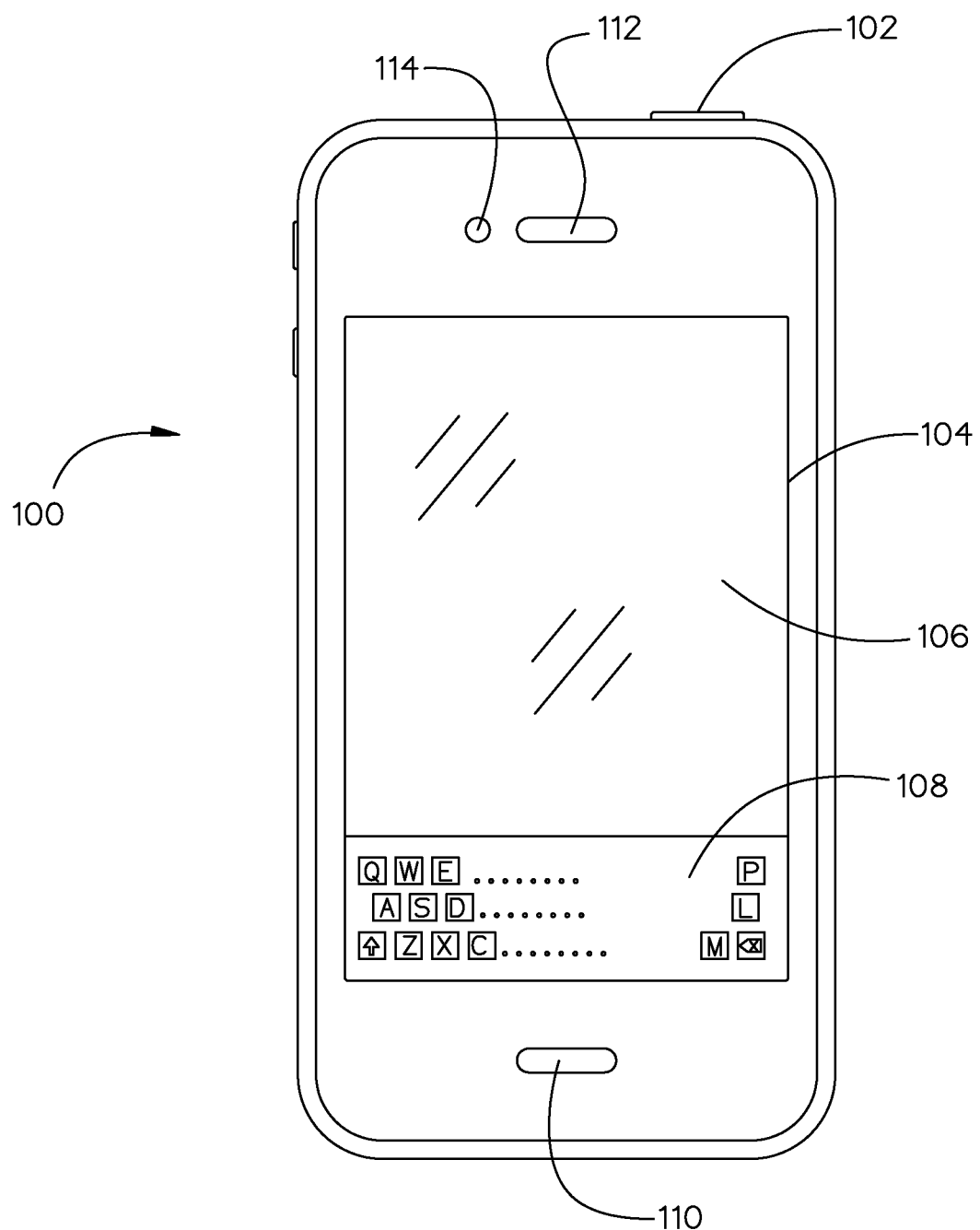
FIG. 1 is a schematic depiction of an exemplary electronic device for carrying out aspects of the present disclosure.

FIG. 1 is a schematic depiction of an exemplary electronic device 100 for carrying out aspects of the present disclosure, in this instance, social media communications with similar devices, as discussed in greater detail below. It will be appreciated by those skilled in the art that the electronic device 100 shown and described herein is illustrative, and that variations on electronic device 100 can include, without limitation, a cellular telephone, tablet or like network access device.

Referring to FIG. 1, electronic device 100 comprises a housing 102 that supports a display 104. Display 104 can comprise one or more light emitters such as an array of light emitting diodes (LED), liquid crystals, plasma cells, or organic light emitting diodes (OLED) or the like. A touch-sensitive membrane 106 is overlaid on display 104 and configured to function as an input device for electronic device 100. As a non-limiting example, electronic device 100 can be configured to selectively show or hide a virtual keyboard 108. Other types of input devices, other than touch membrane 106, or in addition to touch membrane 106, are contemplated. For example, a physical keyboard, touch-pad, joystick or trackball or track-wheel may be employed to enable inputs to be made to electronic device 100. The electronic device further comprises a microphone 110, speaker 112 and camera 114 (although one camera is shown in the drawings, the electronic device may comprise a plurality of cameras, including front and rear facing cameras, as known in the art) to facilitate, inter alia, video conferencing as described in greater detail hereinbelow.

Figure 2:
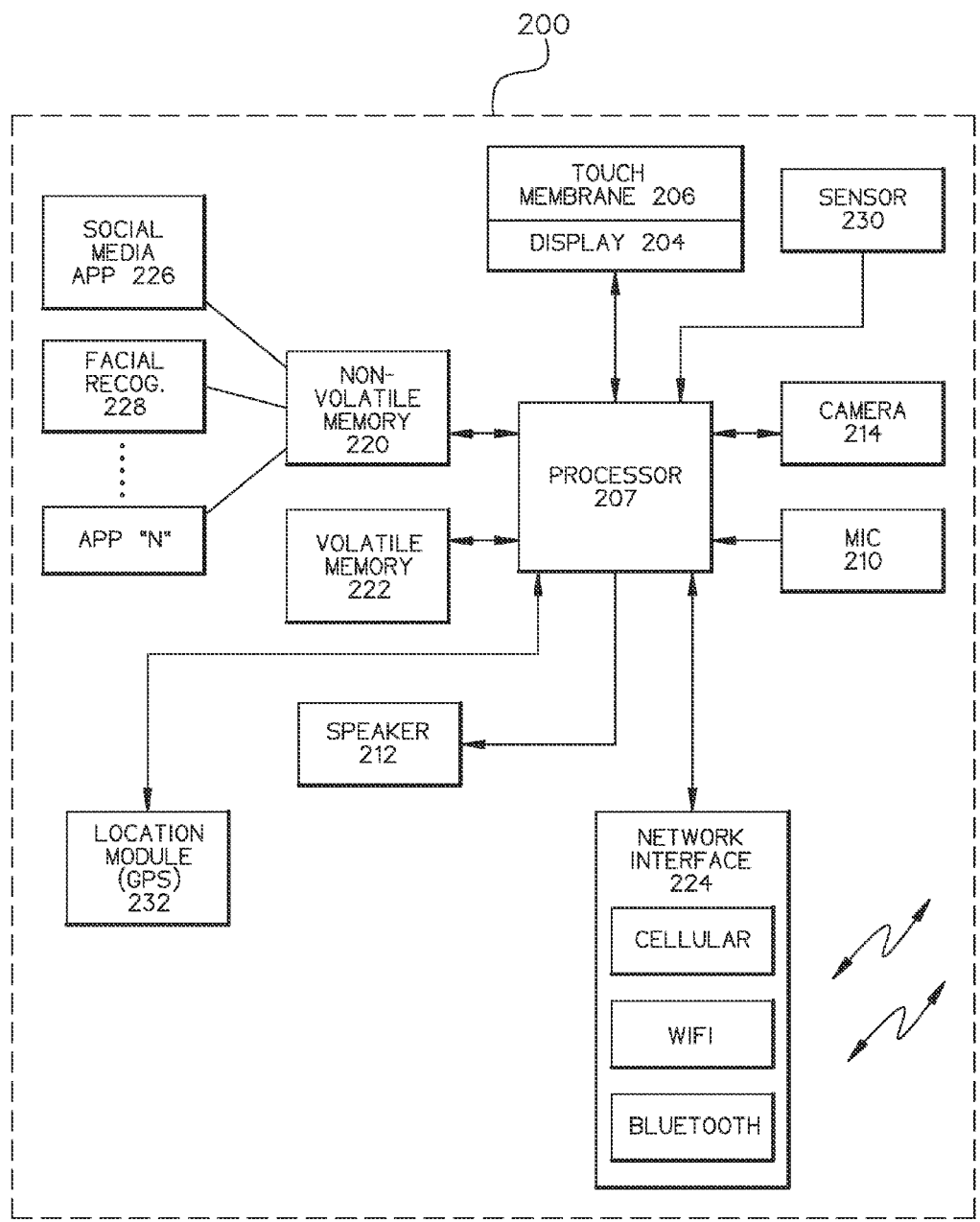
FIG. 2 is a schematic block diagram of an exemplary electronic device.

FIG. 2 shows a schematic block diagram of an exemplary electronic device 200, comprising at least one input device—i.e., display 204 and touch membrane 206, and at least one processor 207 that can be configured to execute different programming instructions responsive to the input received via the the at least one input device. Processor 207 is also configured to communicate with at least one non-volatile storage unit 220 (e.g., Erasable Electronic Programmable Read Only Memory ("EEPROM"), Flash Memory) and at least one volatile storage unit 222 (e.g. random access memory ("RAM")). Programming instructions that implement the functions of device 200 as described herein are typically maintained, persistently, in non-volatile storage unit 220 and executed by processor 207 under the control of instructions stored in volatile storage 222.

Processor 207 is also configured to control display 204, microphone 210, speaker 212, camera 214 and any other peripheral devices associated with electronic device 200.

Processor 207 is further coupled to a network interface 224, which can be implemented in an exemplary embodiment as a radio configured to communicate over a wireless link. Alternatively, the device can communicate via a network interface configured for communicating over a wired link. Network interface 224 can therefore be generalized as a further input/output device utilized by processor 207 to fulfill various functions in accordance with the executed programming instructions. It will be understood that interface 224 is configured to correspond with the network architecture that defines such a link. Present, commonly employed network architectures for such a link include, but are not limited to, Global System for Mobile communication ("GSM"), General Packet Relay Service ("GPRS"), Enhanced Data Rates for GSM Evolution ("EDGE"), 3G, High Speed Packet Access ("HSPA"), Code Division Multiple Access ("CDMA"), Evolution-Data Optimized ("EVDO"), Institute of Electrical and Electronic Engineers ("IEEE") standard 802.11, Bluetooth™ or any of their variants or successors. It is also contemplated each network interface 224 can include multiple radios to accommodate the different protocols that may be used to simultaneously or individually communicate over different types of links.

In an exemplary embodiment, device 200 is also configured to maintain, within non-volatile storage 220, a social media application 226 and optionally, one or more additional applications including but not limited to, facial recognition application 228. Social media application 226 and the one or more additional applications 228 can be prestored in non-volatile storage 220 upon manufacture of device 200, or downloaded via network interface 224 and saved on non-volatile storage 220. As will be explained further below, social media application 226 can be used to interact with other devices that are also configured to execute their own version of social media application 226.

Processor 207 is configured to execute social media application 226, by accessing non-volatile storage 220 and volatile storage 222. Social media application 226 includes the functionality to generate media on device 200 via display 204, and by utilizing microphone 210 and speaker 212. With respect to aspects of the disclosure, the social media application enables video-conferencing (or video-chat) sessions to be established between the electronic device 200 and other electronic devices like device 200 over a communications network.

In accordance with a particular aspect of the disclosure, a facial recognition application (or module) 228 that operates under the control of processor 207 enables the electronic device 200 to determine when the electronic device 200 is moved out of proximity with a user's face during a video-chat via the social media application 226. The facial recognition module may be embodied in hardware, software or a combination thereof. For the sake of illustration, it is known in the art to ascertain facial features from an image captured by camera 214. In this regard, the facial recognition application comprises a series of program instructions stored in non-volatile memory 220 that when executed by processor 207, permit the electronic device to determine when an image (or series of images or frames) captured by camera 214 encompasses more than a face of a user during the video-chat. In this regard, the application may be configured such that the user must first go through a step to recognize his or her face via the camera 214. Once recognized, the user's facial features are stored in memory. Then, during the video-chat Such a determination can then be employed to enable an interrupt to be made to the video-chat if the user attempts to move the electronic device 200 away from the face in an attempt to, for example, expose a greater portion of the user's body, possibly indicating an intent to engage in some type of obscene gesture during the video-chat. The processor 207 then executes a command to disrupt the teleconference by either terminating the video-chat at the electronic device 200, somewhere within the communications network joining the video-chat, or by sending a signal to the networked device on the other end of the video-chat to terminate the connection, or by providing an option for the recipient to manually terminate connection. For example, a signal could be communicated to the other user indicating that the originator has moved the electronic device away from a typical range in proximity to the face and thus indicating an intent to expose more of the originator than the recipient would be comfortable with.

In accordance with another expedient, at least one proximity sensor 230 is disposed on or within the housing 202 of the electronic device, which proximity sensor is communicatively coupled to processor 207 and configured therewith to provide proximity information regarding the distance of the electronic device 200 from a user's face. In this regard, the social media application 226 (or other application) can interrupt the video-chat when a threshold distance is exceeded. In other words, the video-chat is maintained for only so long as the electronic device is disposed within a certain proximity of the user's head during the video-chat. If the user attempts to move the electronic device beyond that distance, then the processor acts to interrupt the video-chat using the same methodology described above.

Device 200 further includes a location module 232 coupled to processor 207 for determining the position of the electronic device 200 as is well known in the art. The location module 232 may comprises a Global Positioning Receiver (GPS) for receiving GPS coordinates from the satellite based GPS system, and/or may optionally compute positional data utilizing signals received via wireless cellular communications, WiFi, or the like. The computation of mobile electronic device position is well understood to those skilled in the art, and thus need not be discussed here in detail. The social media application 226 may utilize the positional data provided by the location module 232, to assist in pairing users for video-chats or other social interaction in accordance with known principles.

Figure 3A:
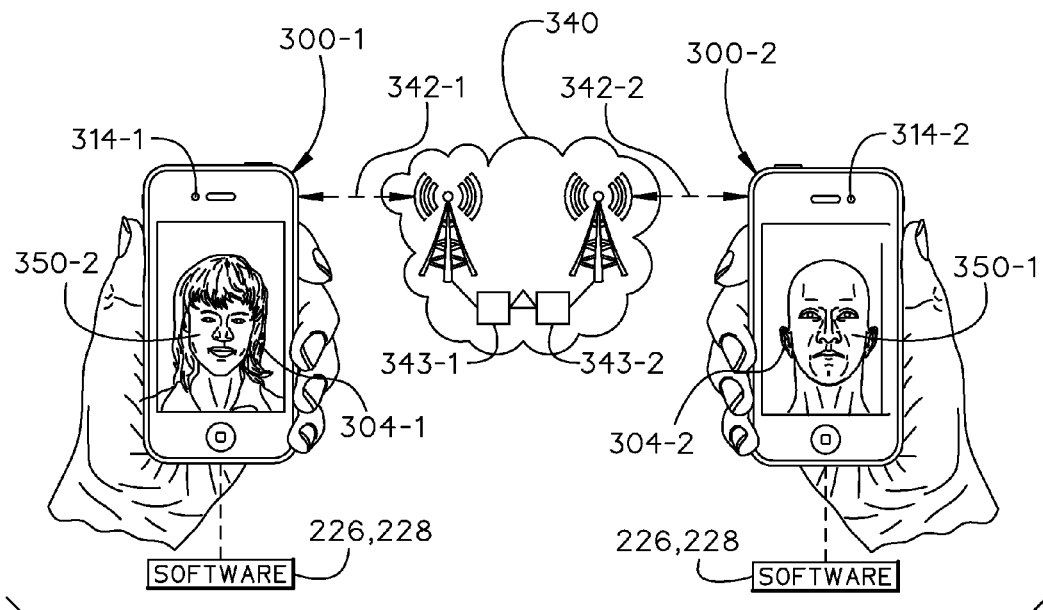
FIG. 3A is an illustrative high-level schematic diagram depicting a pair of users communicating in a video-chat via a communications network.

Referring now to FIG. 3A, there is shown an illustrative high-level schematic diagram depicting a pair of users communicating in a video-chat via a communications network 340. Each user employs an electronic device 300-1, 300-2 identical to device 200 as described above, but each device may have a different configuration from the other. Both devices 300-1, 300-2, include social media application 224 and either the facial recognition application 228 or proximity sensor 230 as described above.

Electronic devices 300-1, 300-2 each connect to a network 340 via a respective network link 342-1, 342-2. Network 340 is shown generally, and may comprise the Internet and/or any other type of network topology that enables communications between devices 300-1, 300-2. Likewise, each link 342 can comprise any combination of hardware (e.g. various combinations of cabling, antennas, wireless base stations, intermediation servers, routers, etc.) and overlaid communication protocols to enable the connection between a respective device 300-1, 300-2 and network 340 as is well known in the art.

Where an intermediate service facilitates the video-chat, at least one server 342-1, 342-2 . . . that also connects to network 340 via respective links 344 may be employed. Each server 343-1, 343-2 . . . can be implemented on physical hardware, or can be implemented in a cloud-computing context as a virtual server. In any event, those skilled in the art will appreciate that an underlying configuration of interconnected processor(s), non-volatile storage, volatile storage and network interface(s) are used to implement each server 343-1, 343-2, . . . . Each server 343 is configured to execute a video-chat bridge application, as is known in the art. The diagram schematically depicts a user's face 350-2 on the display 304-1 of electronic device 300-1 as captured by camera 314-2 of electronic device 300-2. Similarly, during the video-chat, electronic device 300-2 renders the user 350-1 of electronic device 300-1 as captured by camera 314-1 on display 304-2. A smaller inset depicting the user of each device may be concurrently rendered as is well known in the art.

Figure 3B:
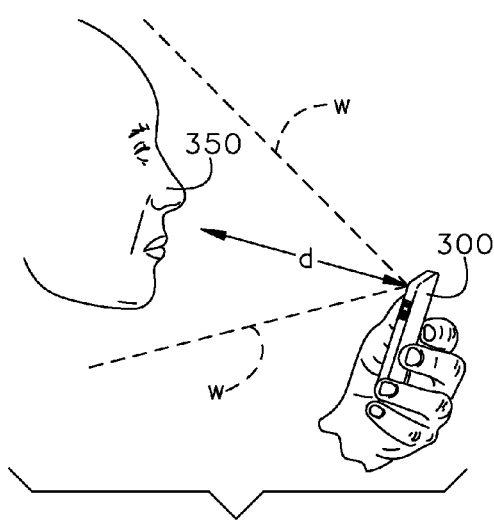
FIG. 3B is a schematic block diagram of a user holding a representative device a prescribed distance from the face.

FIG. 3B is a schematic representation of a user holding a representative electronic device 300 a prescribed distance "d" away from the face 350 such that a field view "w" is exposed to the camera 314.

Figure 4:
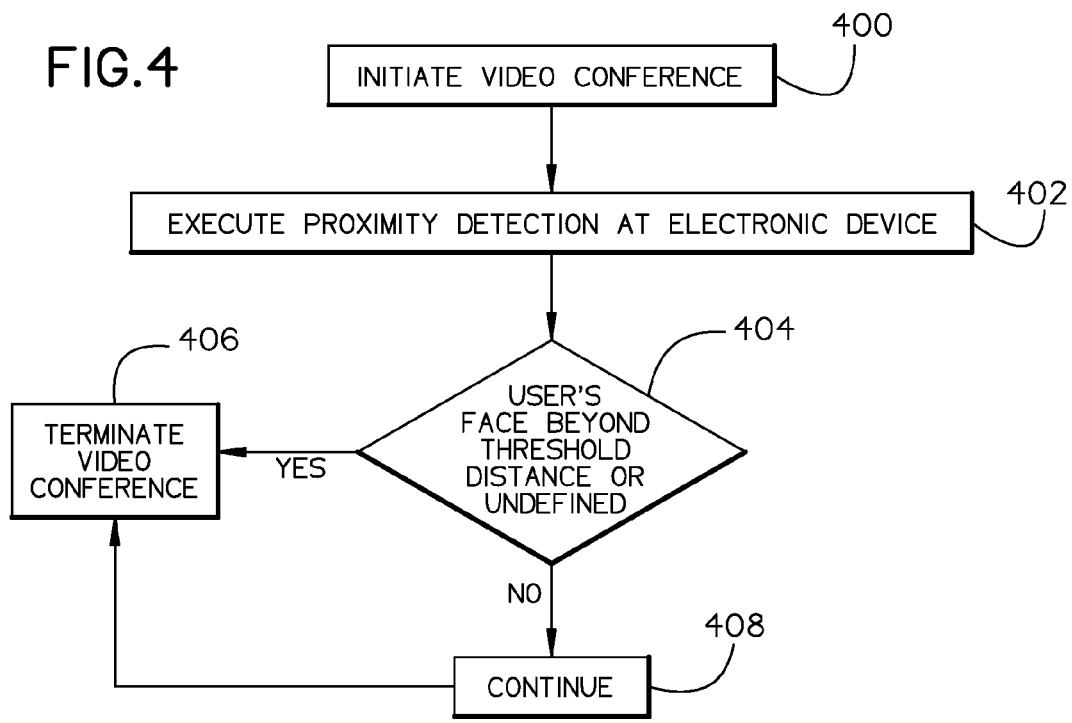
FIG. 4 is depicted an exemplary high-level flow diagram of a method in accordance with an aspect of the disclosure.

Referring now to FIG. 4, there is depicted an exemplary high-level flow diagram of a method in accordance with an aspect of the disclosure. At block 400, a user of an electronic device (as described above), initiates a video-chat with a target device via a communications network.

The video-chat is established by utilizing cooperating social media applications in the respective electronic devices in a manner known in the art. At block 402, a proximity detection step is executed on one or both of the electronic devices to continuously monitor the proximity and/or existence of the respective user's face to the camera of the electronic device. As described in the foregoing, this is either performed via a facial recognition application or a proximity sensor. At block 404 if a user's proximity (distance "d" and field of view "w" illustrated in FIG. 3B) to the electronic device exceeds a defined threshold—either by ascertaining that more than just the user's face is being processed by the camera (or that no face appears), or that a set distance between the user's face and the electronic device has been exceeded via signals from the proximity sensor, then at block 406, the electronic device generates an interrupt. This interrupt either terminates the video-chat on the electronic device, or signals the networked electronic device to terminate the video-chat. For so long as the user's face is recognized by the social media/facial recognition application(s), the video-chat is permitted to continue at block 408.

Figure 5:
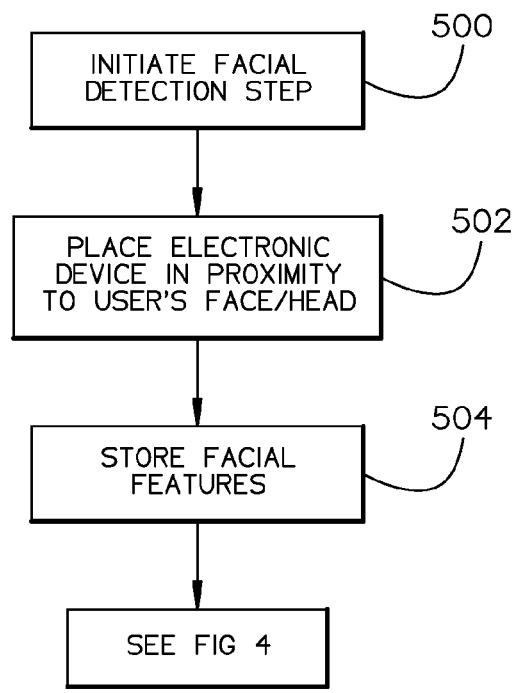
FIG. 5 is depicted a flow diagram for storing facial profile utilized by social media application prior to engaging in a video-chat session in accordance with one aspect of the disclosure.

Referring now to FIG. 5, there is depicted a flow diagram for storing a facial profile utilized by the social media application prior to engaging in a video-chat session in accordance with one aspect of the disclosure. At block 500, the facial recognition application initiates a facial detection step. At block 502, the application instructs the user to hold the electronic device a defined distance away from the face such that only the face, or not much more of the user's body beyond the face/head are shown on the display of the electronic device. This establishes the threshold for subsequently terminating the video-chat. At block 504, the electronic device stores the facial features in memory at the defined distance from the camera/device. The electronic device then processes this information during execution of the video-chat—on a continuous or intermittent basis—as set forth in block 404 of FIG. 4.

The present disclosure has been shown and described in what are considered to be the most practical and preferred embodiments. Having thus described the disclosure of the present application in detail and by reference to embodiments thereof, it will be apparent that modifications and variations are possible and without departing from the scope of the invention defined in the appended claims as follows.

I claim:

1. A method for terminating a video-chat session on a mobile electronic device comprising at least one processor, a non-transitory memory medium, and a camera, the method comprising the steps of:

executing an application on the processor, the application comprising machine readable instructions stored on the non-transitory memory medium, wherein said machine readable instructions comprise:

determining whether the camera is capturing video that satisfies a threshold facial profile associated with the user, said facial profile comprising a set of stored facial features and a defined distance between the electronic device and the user's face;

continuing the video-chat session when the camera is capturing video that satisfies the threshold facial profile; and generating a video-chat interrupt signal when the camera is capturing video that does not satisfy the threshold facial profile.

2. The method of claim 1, further comprising:

detecting a set of facial features of the user in a captured image of the user, wherein said captured image of the user is defined by a distance between the camera and the face of the user and a depth of field of the camera;

generating the facial profile based on the set of facial features, the distance, and the depth of field;

storing the facial profile prior to initiating the video-chat session; and comparing the stored facial profile to facial features processed at least one of continuously and intermittently during the video-chat session.

3. The method of claim 1, further comprising:

sensing a distance between a user's face and the electronic device prior to initiating the video-chat session, the distance corresponding to the camera capturing the face of the user and not more than the face;

at least one of continuously and intermittently processing the distance to determine when the distance exceeds a threshold; and upon determining that the distance exceeds the threshold, generating the video-chat interrupt signal.

4. The method of claim 1, wherein the video interrupt signal discontinues the video-chat session at the electronic device.

5. The method of claim 1, wherein the video interrupt signal is sent via a network to a second electronic device participating in the video chat.

6. The method of claim 1, wherein the video interrupt signal is sent via a network to at least one server hosting the video-chat session.

7. The method of claim 1, wherein the video interrupt occurs automatically.

8. An electronic device configured for participating in a video-chat session over a communications network, and for terminating the video-chat session upon the occurrence of a user exposing more than the user's face during the video-chat session, comprising:
- a camera to capture video of the user's face during the video-chat session;
- at least one processor and at least one non-transitory memory medium comprising machine-readable instructions which, when executed by the at least one processor, enable the electronic device to:
  - initiate a video-chat session with another electronic device over the communications network;
  - determine whether the camera is capturing video that satisfies a threshold facial profile associated with the user, said facial profile comprising a set of stored facial features for the user and a distance between the user's face and the electronic device;
  - continue the video-chat session when the camera is capturing video that satisfies the threshold facial profile; and
  - generate a video-chat interrupt signal when the camera is capturing video that does not satisfy the threshold facial profile.

9. The electronic device of claim 8, wherein the machine-readable instructions, when executed by the processor, enable the electronic device to:
- sense a distance between a user's face and the electronic device prior to initiating the video-chat session, the distance corresponding to the camera capturing the face of the user and not more than the face;
- at least one of continuously and intermittently processing the distance to determine when the distance exceeds a threshold; and
- upon determining that the distance exceeds the threshold, generate the video-chat interrupt signal.

10. The electronic device of claim 8, wherein the video interrupt signal discontinues the video-chat session at the electronic device.

11. The electronic device of claim 8, wherein the video interrupt signal is sent via a network to a second electronic device participating in the video chat.

12. The electronic device of claim 8, wherein the video interrupt signal is sent via a network to at least one server hosting the video-chat session.

13. The electronic device of claim 8, wherein the video interrupt occurs automatically.

14. An electronic device configured for participating in a video-chat session over a communications network, and for terminating the video-chat session upon the occurrence of a user exposing more than the user's face during the video-chat session, comprising:
- at least one processor, a proximity sensor configured to communicate with the at least one processor, and at least one non-transitory memory medium comprising machine-readable instructions which, when executed by the processor, enable the electronic device to:
  - initiate a video-chat session with another electronic device over the communications network;
  - determine, utilizing signals from the sensors, when more than the user's face is captured by a camera of the electronic device during the video-chat session, the determination being a function of a distance between the user's face and the electronic device; and
  - determine, by utilizing signals from the proximity sensor, whether a distance between the user's face and the electronic device exceeds a threshold distance defined for full facial recognition of the user's face;
  - continue the video-chat session when the distance between the user's face and the electronic device satisfies the threshold distance; and
  - generate a video-chat interrupt signal that discontinues the video-chat session when the distance between the user's face and the electronic device does not satisfy the threshold distance.

15. The electronic device of claim 14, wherein the video interrupt signal discontinues the video-chat session at the electronic device.

16. The electronic device of claim 14, wherein the video interrupt signal is sent via a network to a second electronic device participating in the video chat.

17. The electronic device of claim 14, wherein the video interrupt signal is sent via a network to at least one server hosting the video-chat session.

18. The electronic device of claim 14, wherein the video interrupt occurs automatically.

\* \* \* \* \*